June 25, 1946.  W. M. FULTON  2,402,810
AUTOMATIC STOKER
Original Filed Oct. 9, 1939  6 Sheets-Sheet 4

June 25, 1946. W. M. FULTON 2,402,810
AUTOMATIC STOKER
Original Filed Oct. 9, 1939 6 Sheets-Sheet 6

Inventor
Weston M. Fulton
By Cameron, Kerkam + Sutton
Attorneys

Patented June 25, 1946

2,402,810

UNITED STATES PATENT OFFICE 2,402,810

AUTOMATIC STOKER

Weston M. Fulton, Knoxville, Tenn., assignor to W. J. Savage Company, Inc., Knoxville, Tenn., a corporation of Tennessee Original application October 9, 1939, Serial No. 298,661, now Patent No. 2,269,812, dated January 13, 1942. Divided and this application July 24, 1941, Serial No. 403,930

12 Claims. (Cl. 110—32)

This invention relates to automatic stokers for burning solid fuel, and more particularly to the "cross draft" type of stoker such as that generally described and shown in my U. S. Patent No. 2,126,104, granted August 9, 1938.

Cross draft stokers of the types now known and used possess a number of objectionable features. These defects and shortcomings are due in part to the stringent requirements of the domestic field in which these stokers are widely used. Domestic stokers are required to meet conditions quite different from power plant stokers. For example, domestic stokers are used principally in the heating of residences, small apartment houses, etc., where the heating load varies with the weather and consequently is subject to very wide extremes. Noise and dust must be avoided. Further, domestic stokers are cared for either by the house owner or by a domestic servant, the vast majority of whom are not familiar with mechanical devices and consequently neglect the mechanical upkeep of the stoker. Power plant stokers, on the other hand, operate under more uniform load conditions; are installed in industrial plants with other noisy machinery, need not be silent and are under the constant care of a skilled power plant engineer. Power plant stokers are usually installed at the time the power plant itself is installed, whereas the vast majority of domestic stokers are installed on heating plants of varying design that have been in service for a greater or less length of time with resulting installation difficulties not found in the power plant stoker.

Another objection to known stokers of this type is their inability to remain idle for protracted periods of time when the load demand drops to, or near, zero, and then promptly resume normal functioning when the demand abruptly and drastically increases. When these stokers are standing idle it is necessary to admit an appreciable amount of air to the combustion zone to create a "natural draft" through the chimney, or smoke pipe to which the stoker is connected. Otherwise smoke and fumes arising from the incandescent fuel in the burner would escape around the access doors of the stoker and fill the furnace room and work their way up into the living quarters of the house being heated. This "natural draft" produces slow combustion of the fuel in the stoker, and, if greatly prolonged, will consume all available fuel and the fire becomes very low. When demand is resumed and fresh fuel is fed into the stoker this fuel is consumed as fast as it is fed to the stoker and the fire has great difficulty in building up again to normal proportions. This objection may be illustrated by reference to the shaker grate type of stoker in wide use in which fuel is discharged by gravity from the feed hopper to the shaker grate and moves slowly over the grate while being consumed. The rate of feed and rate of combustion are so timed that combustion will be completed as the moving fuel reaches the discharge end of the shaker grate. If the load demand drops and the stoker remains idle for a protracted period of time, the "natural draft" required to carry fumes away will consume all the fuel at the lower end of the shaker grate (this fuel having already been partially consumed), and consequently this portion of the grate will be covered with dead ash. When demand is resumed, all the cold air from the blast fan which passes through the lower portion of the grate will find no fuel with which it may combine and will mingle with the hot gases rising from the burning fuel at the upper end of the grate, cooling these gases and reducing their heating effect. Furthermore, since the rate of feed and rate of combustion are timed for normal working conditions under a fairly constant load, the feeding device is now lacking in capacity to supply sufficient fuel for actual combustion plus a surplus sufficient to again cover the lower portion of the shaker grate. Various devices such as the so-called "automatic air controls" for adjusting the air supply to correspond with the thickness of the fuel bed have been produced in an effort to cure this defect in these stokers, but these devices have met with little more than indifferent success.

Another objection to known stokers of the cross draft type, to which the present invention pertains, is that they have hitherto failed to provide ready access of air to that portion of the fuel lying against the opposing wall sections of the combustion chambers. In stokers utilizing the cross draft principle the distance between the front and rear sections of the combustion chambers must be relatively small to maintain a relatively thin fire-bed, since in a thick fire-bed the temperature of combustion reaches such a high point that large, unwieldy clinkers are formed in the combustion chambers, clogging the latter and making ash disposal difficult. Hollow, water-cooled members in close proximity to each other and in physical contact with the burning fuel have been used to rapidly conduct heat away from the fuel and prevent the temperature of the latter from rising materially above the fusing point of the ash. This expedient fails when the fire-bed is very thick since a region will still exist midway between the front and rear sections where high temperatures will prevail and objectionable clinkers will form. When a thin fire-bed is used the width of the front and rear sections of the combustion zone has been relatively large. Hence there are zones or pockets in the fuel bed where the latter lies against these front and rear sections which the air cannot reach since the tendency of the air is to pursue a straight-line course through the fuel and the slight resistance to the progress of the air offered by the fuel in a relatively thin fire-bed is not sufficient to cause the air to diffuse in the burning zone. This results in uneven burning of the fuel, fusion and consequent sticking of the fuel in the pockets referred to and arching of the entire fuel bed in the combustion chambers.

Still another defect in known stokers of the cross draft type is that hitherto only gravity discharge of the ash has been possible. The presence of foreign matter in the fuel has resulted in clogging the ash discharge in the absence of positive mechanical means for forcing obstructions out of the path of ash flow.

Another defect in known cross draft stokers is the tendency of radiant heat to escape from the incandescent fuel through the openings of the inlet tuyères causing a substantial waste of heat. Some smoke and fumes occasionally escape through the inlet tuyères as well.

Another defect in known cross draft stoker is that fine particles of incombustible matter given off from the burning fuel lodge in the passageways of the heater. This incombustible matter, known as "fly-ash," is greatly increased in quantity by the forced draft usually provided with these stokers. No satisfactory method has hitherto been devised for automatically disposing of this "fly-ash."

A still further defect of the known cross draft types of stokers is that a suitable amount of fire travel between the burning fuel and the heating surface of the boiler cannot be provided. To those skilled in the art it is well known that the flame generated by burning fuel is composed of a mixture of hot gases which are rapidly undergoing chemical changes and these changes proceed to completion only after the flame has travelled a considerable distance away from the burning fuel. If these hot gases come into contact with any relatively cool surface, such as the crown sheet of a boiler, and are thereby cooled below the temperature of ignition of the component gases before combustion has been completed, chemical change will be arrested and the temperature of combustion will fall short of its maximum reducing the heating effect and wasting fuel. This is a matter of such importance that heating inspectors in many localities require that all stokers installed within their jurisdiction have a specified minimum distance between the stoker or burner and the heating surface of the boiler.

It is accordingly an object of the present invention to provide a novel cross draft type of stoker which is suitable for general requirements, particularly domestic, and which is readily adaptable for use with existing heating plants.

Another object of the present invention is to provide a novel cross draft type of stoker which can after long periods of idleness promptly resume normal operation when the heat demand is increased.

Another object of the present invention is to provide a novel cross draft type of stoker in which combustion supporting gases may reach every portion of the burning zone.

Another object of the present invention is to provide a novel cross draft type of stoker in which the formation of clinkers is reduced to a minimum.

Another and still further object of the present invention is to provide a novel cross draft type of stoker in which means are provided for the automatic removal of entrained particles and "fly-ash" from the gases of combustion.

Another and still further object of the present invention is to provide a novel cross draft type of stoker in which a suitable amount of fire travel is provided to insure complete combustion of the gases of combustion before they reach the heating surfaces.

Another and still further object of the present invention is to provide a novel cross draft type of stoker in which auxiliary means are provided for removing fumes and gases generated during periods when the stoker is idling which is automatically controlled in conjunction with the dampers of the stoker.

Another and still further object of the present invention is to provide a novel cross draft type of stoker in which the cross draft is induced in rather than forced through the burning zones.

Another and still further object of the present invention is to provide a novel cross draft type of stoker in which novel means are provided for inducing the cross draft in the burning zones.

Another and still further object of the present invention is to provide a novel cross draft type of stoker which is silent in operation, efficient, compact, relatively inexpensive to manufacture and install and which may be operated without prior knowledge or training.

Other and further objects of the present invention will appear as the description thereof proceeds.

With these objects in view, an illustrative embodiment of the cross draft stoker of the present invention is shown in the accompanying drawings but it is to be expressly understood that this embodiment of the present invention is shown in the accompanying drawings and hereafter described for the purposes of illustration only and is not to be construed as a limitation on the present invention. Reference should be had to the appended claims to determine the scope of the present invention.

In the accompanying drawings.

Figure 1:
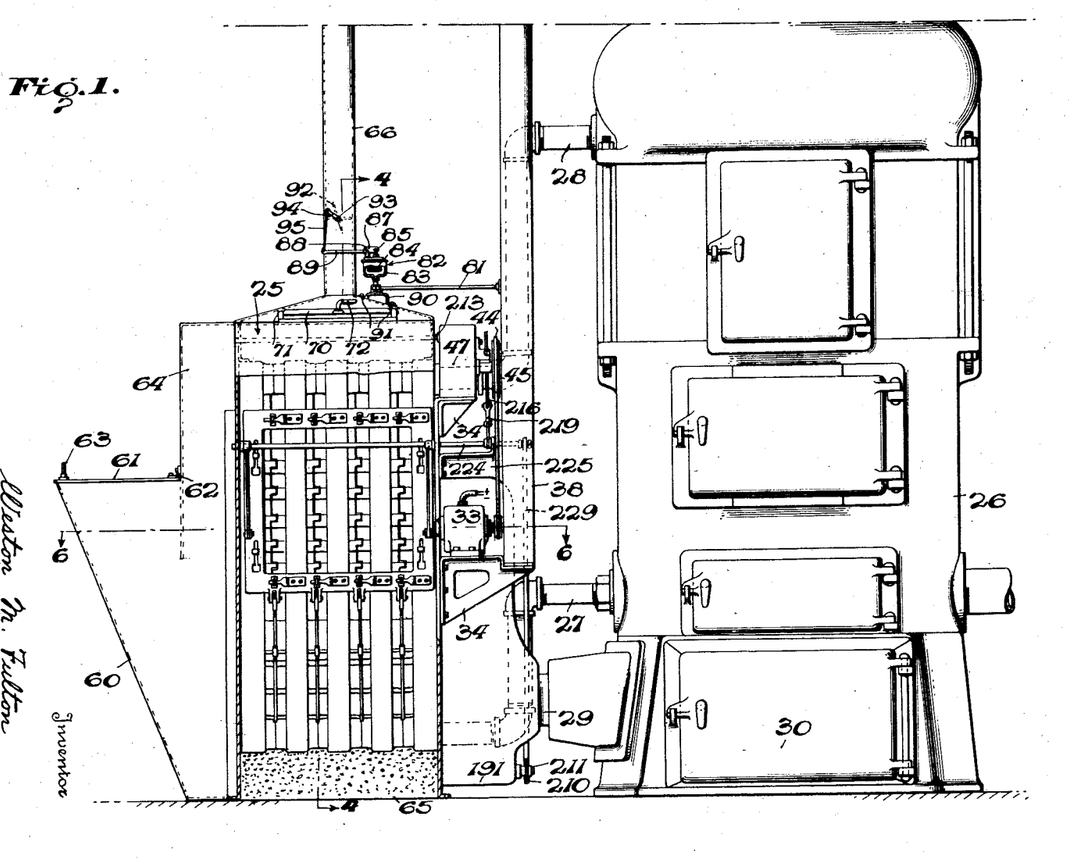
Fig. 1 is a front elevation of one embodiment of the novel cross draft stoker of the present invention shown installed with a boiler of the usual type and having a portion of the front of the stoker jacket broken away to show the front of the stoker.
Figure 1A:
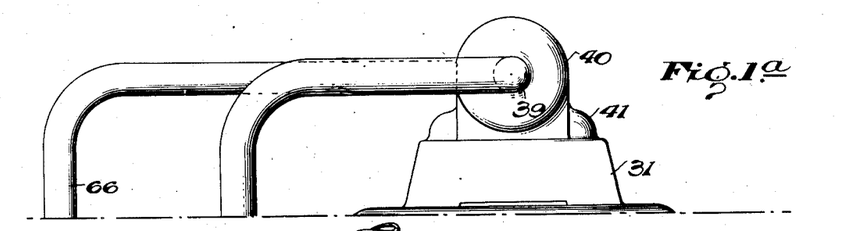
Fig. 1a is a continuing view of Fig. 1 showing a front elevation of the ejector and smoke eduction passages.

Referring now to the accompanying drawings in which like reference characters indicate similar parts and more particularly to Fig. 1, the stoker 25, made up of hollow sections, is connected to the boiler 26 by means of pipes 27 and 28, in accordance with the practice known to the art for stokers of this type to permit free exchange of water and steam between the boiler and stoker. Combustion of fuel takes place in the stoker 25 and the hot products of combustion pass through the stoker outlet 29 into the ash pit 30 of boiler 26 thence upward through the heating passageways of boiler 26 and out through the smoke-hood 31 to the smoke-pipe 32. It has hitherto been the practice to apply forced draft to stokers of this type. In the present invention, an induced draft is used. To create the desired induced draft an electric motor 33, supported on bracket 34 attached to stoker 25, carries the rotor 35 (Fig. 3) of a blower 36 on the end of the motor shaft 37. Said blower 36 discharges air through pipe 38 into the air intake 39 of ejector 40 which is in communication through chamber 51 with suction chamber 42. Pipe 41 extends from smoke-hood 31 to said suction chamber 42 of ejector 40 and the gases are delivered through pipe 32 to any suitable chimney or stack (not shown). Motor shaft 37 has pulley 43 keyed thereon and belt 44 transmits power from pulley 43 to pulley 45 which is keyed to shaft 46 of speed reducer 47 of any standard construction.

Figures 5, 9:
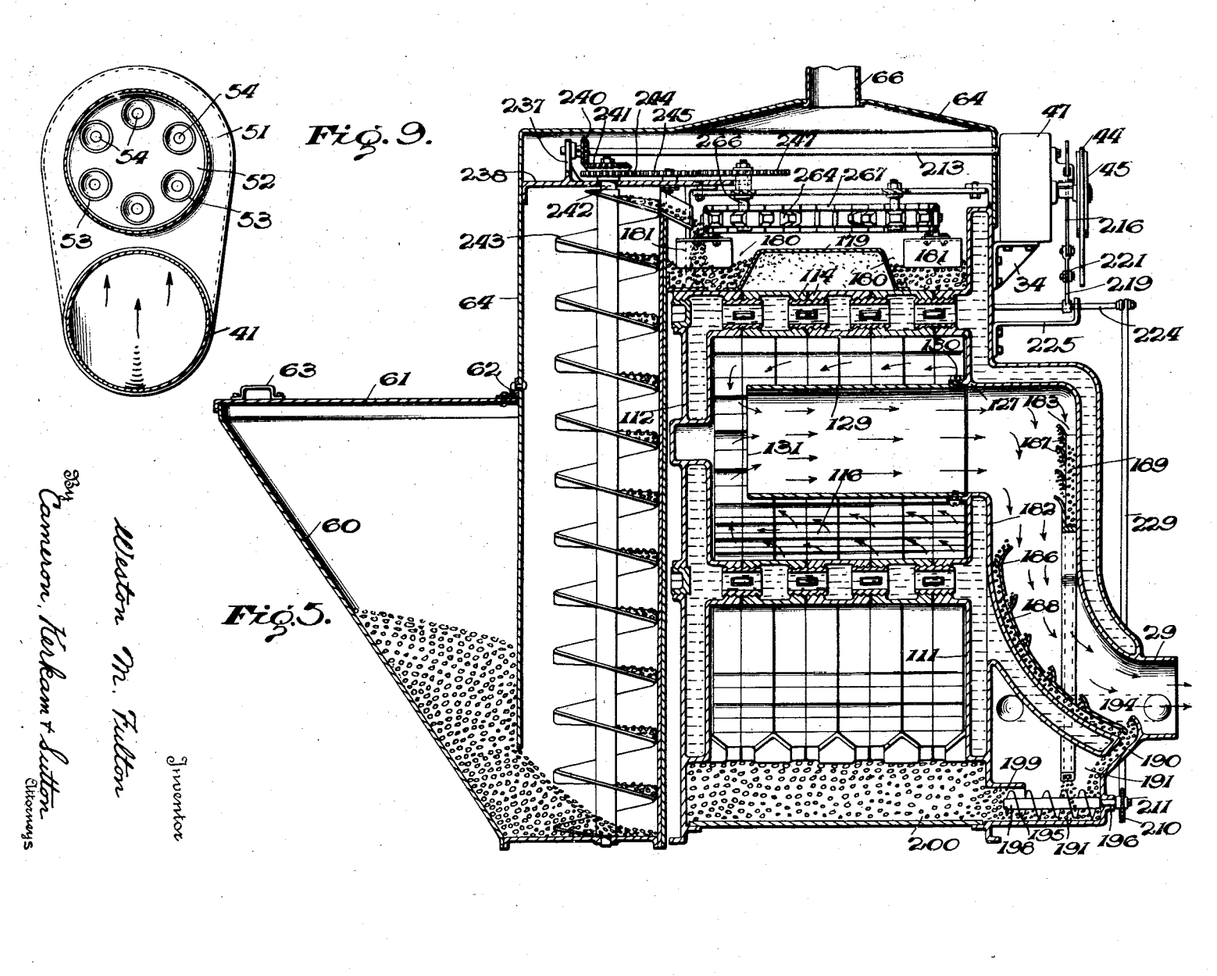
Fig. 5 is a cross-sectional elevation on the line 5—5 in Fig. 3 of the embodiment of the present invention shown in Fig. 1.
Fig. 9 is a cross-section of the ejector on the line 9—9 of Fig. 7.
Figures 6, 7, 8:
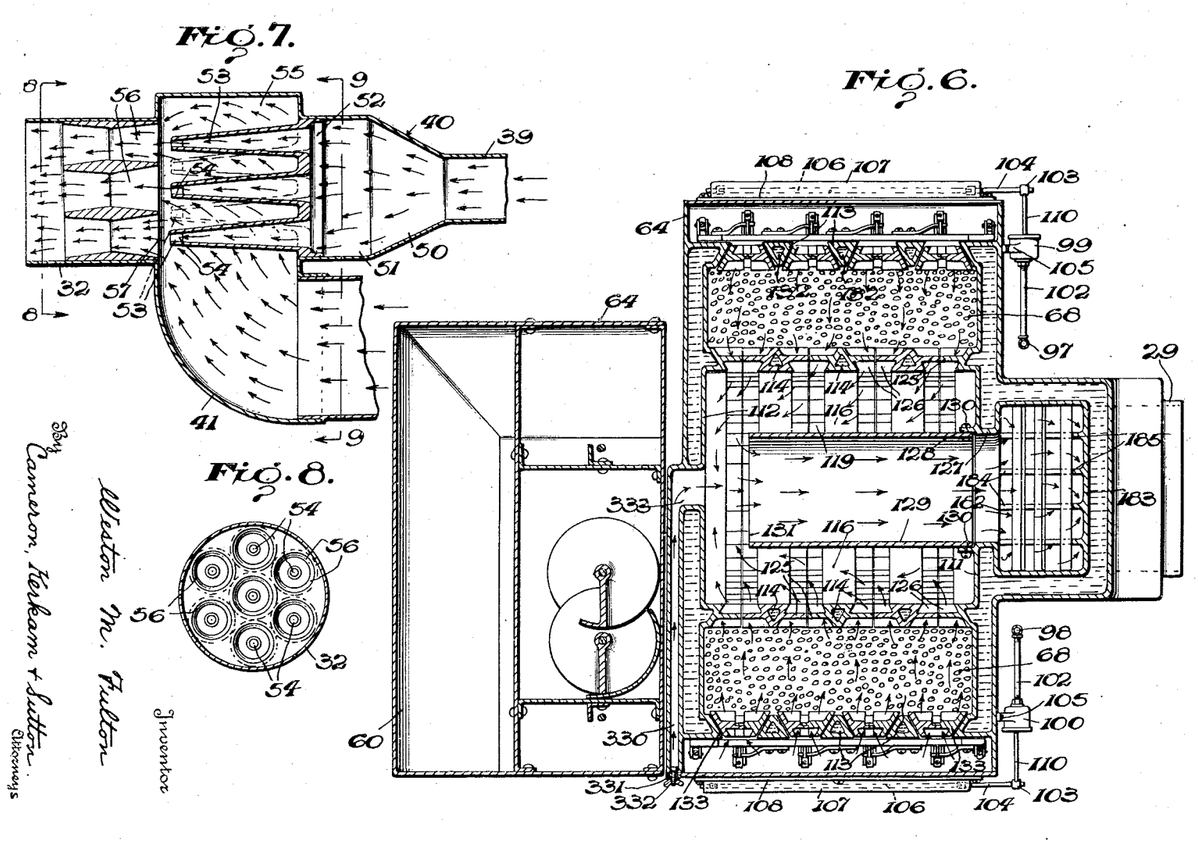
Fig. 6 is a sectional view on the line 6—6 of the embodiment of the present invention shown in Fig. 1, the electric motor and fan being omitted for clarity.
Fig. 7 is a longitudinal section of the ejector shown in Fig. 2.
Fig. 8 is a cross-section on the line 8—8 of the ejector of Fig. 7.

Referring now to Figs. 7, 8 and 9 a novel ejector of the multi-nozzle type is there shown suitable for use with the novel stoker of the present invention. As shown in these figures primary air is brought to ejector 40 through pipe, or duct, 39, and said ejector is progressively enlarged in diameter through the portion 50 and terminates in chamber or reservoir 51. Chamber 51 is closed by wall 52 in which are inserted a plurality of tapered ejector nozzles 53. The sum of the areas of the nozzle outlets 54 is made substantially less than the area of the air inlet pipe 39 so that air can enter chamber 51 through pipe 39 faster than it can be discharged through the nozzle outlets 54, thus insuring that air at substantially full blower pressure will be stored in chamber 51 and that each nozzle 53 will be supplied with equal air pressure therefrom. Nozzles 53 project into chamber 55 where the gaseous products from the stoker are received from pipe 41 and accumulated, and from which they are ejected through a plurality of ducts or passages 56, one for each nozzle 53, formed in a header, each duct being restricted intermediate its length. As shown said passages taper to a constriction and then are enlarged in cross section, and have inlet ports 57 in the wall of the chamber 55 aligned with said nozzles 53. This construction insures that equal amounts of ejected gas, at substantially equal back pressure, will be available for each nozzle and maximum efficiency will be obtained.

Figure 2:
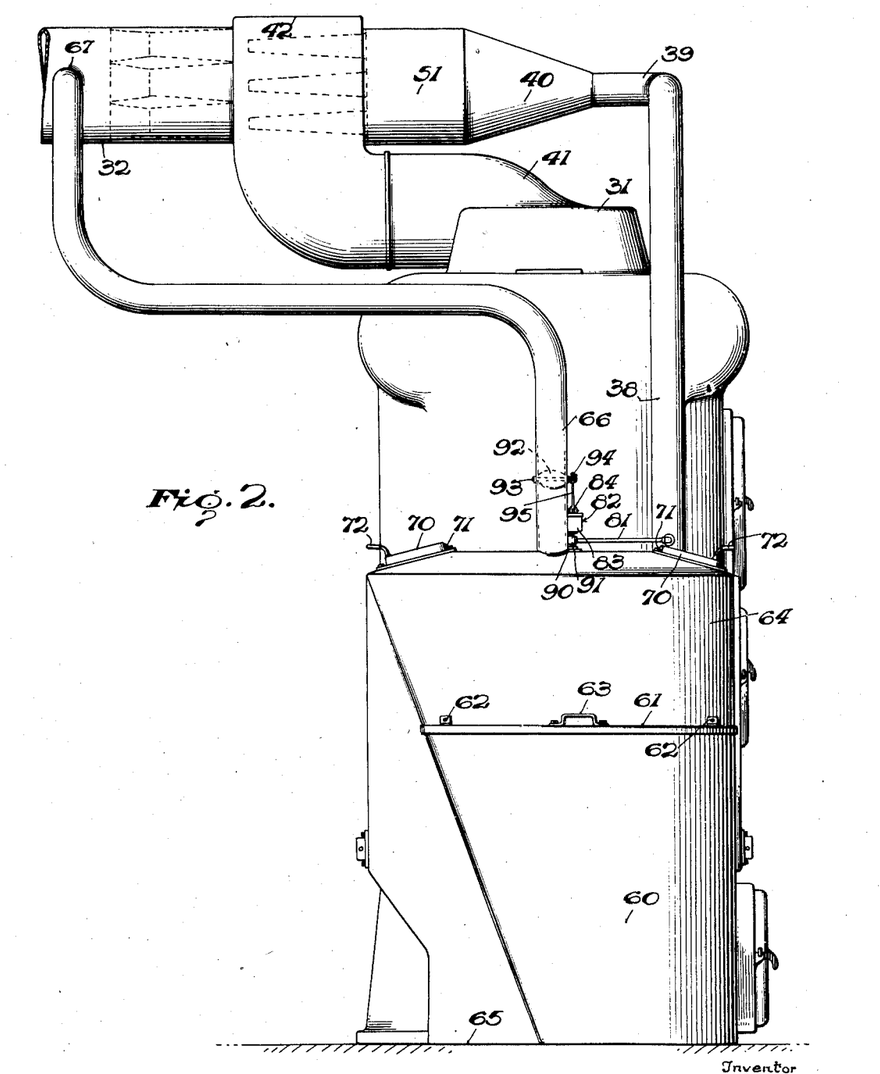
Fig. 2 is a side elevation as seen from the left of the embodiment of the present invention shown in Fig. 1.

Referring more particularly now to Figs. 1 and 2, fuel hopper 60 is provided with lid 61 hinged at 62 and provided with a handle 63. A metal jacket, or covering, 64 surrounds stoker 25 and extends to the bottom 65 thereof to form a substantially air-tight closure around stoker 25. At the top of jacket 64, and in communication with the interior thereof, is vent pipe 66. Pipe 66 leads to any suitable outlet such as the chimney used with boiler 26; it may connect to ash pit 30 of boiler 26; or, as here shown, it may connect at 67 to smoke pipe 32. Jacket 64 has adjacent its top, and immediately above combustion chambers 68 (Fig. 4), two openings 69, which are provided with lids 70 hinged at 71 and provided with handles 72. Each handle 72 has a round extension 73 journalled in lug 74 integral with lid 70. Extension 73 carries latch 75 which, when lid 70 is closed, can be rotated to engage reinforcing member 80. Each lid 70 is opened by rotating handle 72 to disengage latch 75 and lid 70 can then be raised to the open position shown in dotted outline at the left in Fig. 4. This arrangement permits access to combustion chambers 68 for starting the fire in the stoker and gives access to the working parts.

Connected to air duct 38, and in communication with the interior thereof, is pipe 81 which takes air under pressure from duct 38 to any suitable pressure responsive device 82 here shown as comprising a cast iron housing 83 inclosing bellows member 84 having a plunger 85 attached to its movable wall. Plunger 85 pivotally engages member 87 which in turn is mounted upon pivot 88 and carries a lever arm 89. Pressure responsive device 82 is supported in any suitable way here shown as by bracket 90 suitably secured to jacket 64 as by screws or rivets 91. Mounted in vent pipe 66 is damper 92 supported on pivot 93 to which is secured operating arm 94. Arm 94 pivotally engages link 95 which is in turn in pivotal engagement with lever arm 89 of the pressure responsive device 82.

Figure 3:
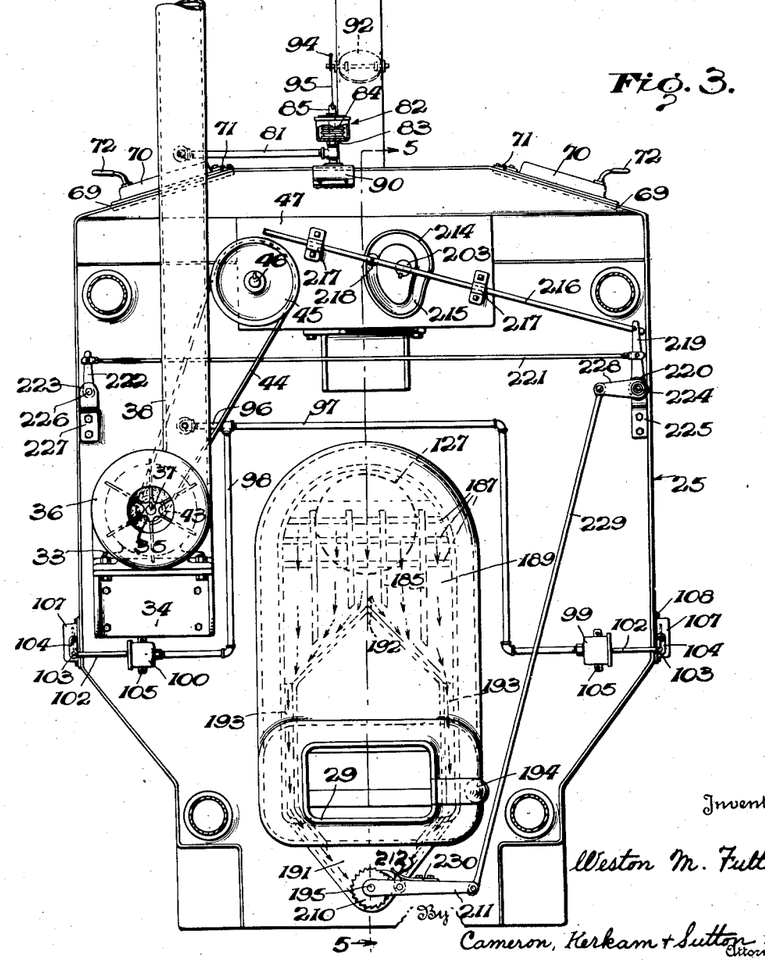
Fig. 3 is a side elevation as seen from the right of the embodiment of the present invention shown in Fig. 1 with the boiler removed.
Figure 4:
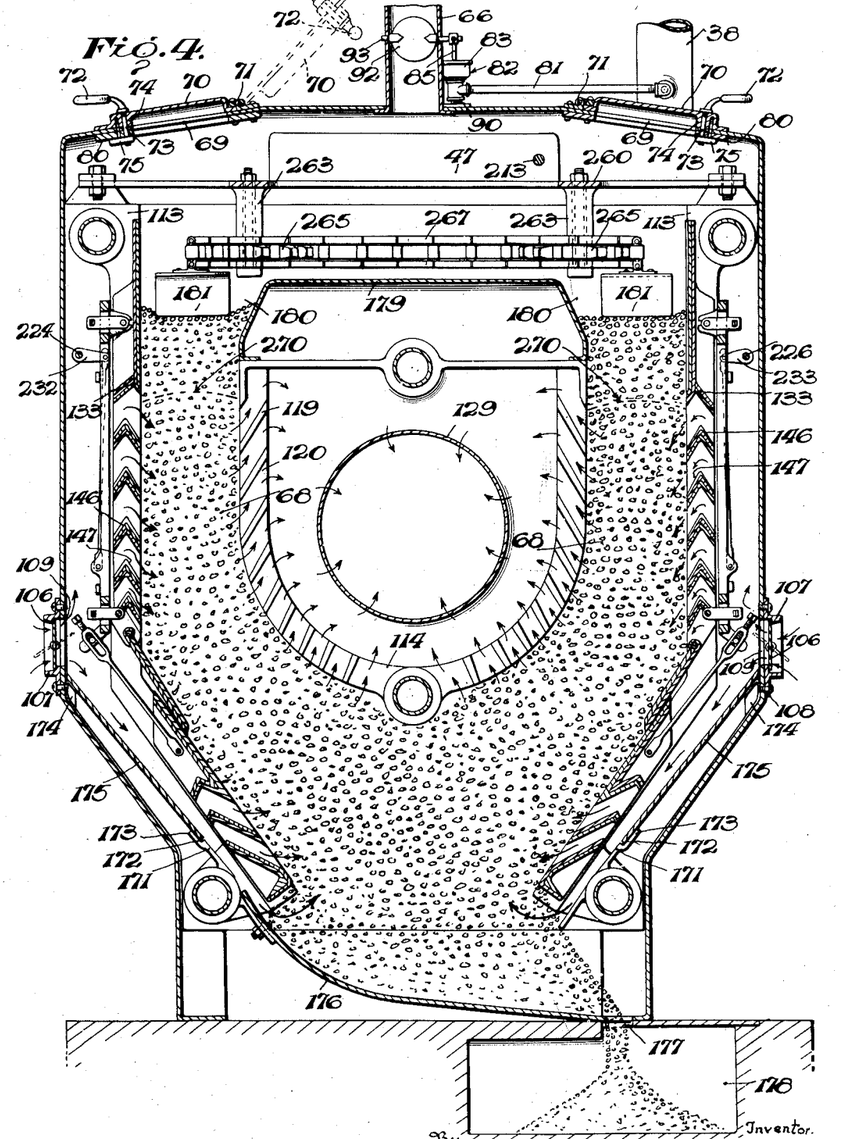
Fig. 4 is a cross-sectional elevation on the line 4—4 of the embodiment of the present invention shown in Fig. 1.

Referring now to Figs. 3, 4 and 6, in communication with a duct 38 is a pipe 96 communicating in turn with branch pipes 97 and 98 leading to suitable pressure responsive devices 99 and 100, here shown as of similar construction to pressure responsive device 82. Pressure responsive devices 99 and 100 are provided with plungers 102, pivotally connected at 103 to damper arms 104. Pressure responsive devices 99 and 100 are attached to stoker 25 by brackets 105. Suitable dampers 106 are mounted in housings 107 provided with flanged portions 108 by which housings 107 are suitably secured to jacket 64 by screws, rivets or other suitable means. Housings 107 surround suitable openings 109 (Fig. 4) which are provided in jacket 64 for the admission of air to support combustion in stoker 25. Dampers 106 are provided with trunnions which are mounted in the ends of housings 107 for rotation therein. Damper arms 104 are secured to one end of trunnions 110 to enable pressure responsive devices 99 and 100 to operate dampers 106.

Referring now to Figs. 1 to 6, inclusive, it will be seen that the combustion chambers 68 of my improved stoker are built up of a plurality of hollow sections spaced from each other and secured together by a plurality of hollow nipples which are screwed into suitable threaded bosses or openings in each section. As shown in Fig. 6, hollow side sections 111 and 112 are mounted therebetween one or more hollow outside sections 113 and an equal number of inside hollow sections 114. Combustion takes place in the combustion chambers 68, inclosed by side sections 111 and 112, outside sections 113 and inside sections 114, and the hot gases from the burning fuel pass out through the central chamber 116 formed by inside sections 114. Outside sections 113 are identical in construction, being hollow to provide passages through which water may freely circulate and having their lower portions downwardly and inwardly inclined towards the middle of the burner so that said lower portions are closer at their lower extremities than at their upper extremities as is apparent from Fig. 4. The inside sections 114 are also hollow to provide passages through which water can freely circulate, and have ribs 119 formed integrally therewith, the spaces 120 between ribs 119 constituting tuyères through which the hot gases of combustion enter central chamber 116. Side sections 111 and 112 have ribs 125 formed integrally therewith with spaces 126 therebetween so that when assembled said sections form companion tuyères with those formed by the inside sections 114.

Side section 111 has therein a suitable opening 127 surrounded by extension 128 into which is fitted a suitable member 129 suitably secured thereto, by any convenient means here shown as by screws 130, and extending into chamber 116. Member 129 forms an outlet through which the gaseous products of combustion pass in their travel to boiler 26. Member 129 may be made of any suitable heat-resisting material such as fireclay or any of the heat-resisting alloys. Member 129 is so designed that the hot gases of combustion emerging from tuyères 126 nearest opening 127 must travel to the opposite side of stoker 25 before escaping through open end 131 of member 129 to give the gaseous products of combustion a long path of travel and ample time in which the chemical reactions of combustion may be completed before the gaseous products of combustion come into contact with the relatively cool interior passageways of boiler 26. As member 129 is exposed to the hot gases of combustion emerging from tuyères 120 and 126 its outer and inner surfaces are maintained at high temperatures. The gases in contact with and surrounded by these surfaces will therefore be held at a temperature above the temperature of ignition of the component elements of the gases until they emerge from opening 127. Adequate fire travel to insure complete combustion is thus provided by the present invention.

Inside sections 114 are V-shaped in cross section (Fig. 6) with the apex of the V pointing towards combustion chambers 68. Outside sections 113 are also V-shaped with the apex of the V pointed towards combustion chambers 68. Sections 113 have no tuyère forming ribs. Hollow hubs 132 (Fig. 6) formed on sections 113 project a sufficient distance beyond the sides of sections 113 to form suitable spaces therebetween in which oscillating tuyère members 133 having upwardly and then downwardly inclined air passages 146, 147 (see Fig. 4) are mounted for reciprocation. As said oscillating tuyère members 133 and the means for operating the same have been fully disclosed in my application Serial No. 298,661, filed October 9, 1939, issued January 13, 1942, as U. S. Patent No. 2,269,812, to which cross reference is made, a detailed explanation herein is unnecessary.

Referring more particularly to Fig. 4, formed adjacent the lower ends of side sections 111 and 112 are plates 171. Plates 171 are provided with offsets 172 having extensions 173. Also formed on sections 111 and 112 are lugs 174 designed to receive plates 175 positioned between sections 111 and 112, plates 175 having their upper ends supported by lugs 174 and their lower ends supported in offsets 172. Plates 175 catch any dust or ash which may sift through tuyères 133 and direct this waste matter downward into the ash discharge. Suitably secured to plates 171 are curved plates 176 which close the space between sections 111 and 112 and extend forwardly to a point adjacent the front of the stoker. Plates 176 deflect the ash traveling downward from combustion chambers 68 into opening 177 of a suitable ashpit 178. Plates 176 are here shown secured to the left sides (Fig. 4) of sections 111 and 112 but it is to be understood that plates 176 can be connected at the right if desired. Ashpit 178 would then be located near the left side of Fig. 4, this feature rendering installation of the stoker more flexible.

As is best seen in Figs. 4 and 5, a suitable member 179 is spaced from and covers the top of stoker sections 114 providing a suitable space 180 around it in which scrapers 181 may move with ample clearance. Member 179 prevents fuel from accumulating in the space on top of stoker sections 114.

Stoker side section 111 is provided with a hollow, water-cooled outlet 29 (Figs. 5 and 6) for conducting the hot gaseous products of combustion from outlet 127 and member 129 into boiler 26. Outlet 29 is of suitable cross section here shown as rectangular and is downwardly directed to deliver the hot gases of combustion at, or near, the bottom of boiler 26, as may be seen in Fig. 1. Outlet 29 has vertically disposed ribs 184 and 185 suitably secured to opposite walls 182 and 183 to which are attached cross members 186 and 187 forming dust-collecting passages 188 and 189 therebetween. Cross members 186 and 187 have their upper edges turned outwardly towards the passage leading to outlet 29 and are suitably separated from each other to form traps by which fly-ash and dust particles may enter passages 188 and 189. Passages 188 empty into a suitable passage 190 which in turn empties into dust-collecting chamber 191. Passages 189 are divided into two branches 193 (Fig. 3) which straddle outlet 29 and discharge into dust chamber 191. A suitable passage 194 connects dust chamber 191 and outlet 29. The area of passage 194 is greater than the area of passage 190. When induced suction or draft is applied to outlet 29 through boiler 26 to which it is connected, gases can escape from dust chamber 191 through passage 194 faster than they can enter through passage 190 producing a reduced pressure inside chamber 191. Mounted in chamber 191 is conveyor screw 195 journalled at 196 in the wall of chamber 191 and having its discharge end 198 loosely mounted in a suitable cylindrical hub 199 opening into ash discharge passage 200. End 198 of screw 195 terminates short of the entrance of hub 199 into ash discharge passage 200 to permit a suitable quantity of dust or fly-ash to accumulate in hub 199 to form a seal or plug to prevent air from being drawn in chamber 191 through ash discharge 200. A ratchet wheel 210 is secured to screw 195 and is operated by a lever 211 from speed reducer 47.

Referring particularly to Fig. 3, speed reducer 47 has a suitable reduced speed shaft 203 on which is mounted a suitable cam 214 provided with a cam groove 215. Rod 216 mounted for reciprocation in brackets 217 has rotatably mounted thereon a suitable roller 218 designed to engage and travel in cam groove 215. Rod 216 pivotally engages arm 219 of crank 220. Pivotally engaging arm 219 of crank 220 is rod 221 which in turn pivotally engages arm 222 of crank 223. Crank 220 is fixed to shaft 224 which is journalled in bracket 225 attached to stoker 25. Crank 223 is fixed to shaft 226 which is journalled in bracket 227 also attached to stoker 25.

Shaft 224 has fixed thereto crank arm 228. Pivotally engaging arm 228 is rod 229 which in turn pivotally engages lever 211 bifurcated at its opposite end with the bifurcations loosely journalled on screw 195. Between the bifurcations, and fixed to screw 195, is ratchet wheel 210 whose teeth are engaged by pawl 212 urged into engagement with ratchet wheel 210 by spring 230. Bearings are provided in side sections 111 and 112 to support shafts 224 and 226. Shafts 224 and 226 extend across from stoker side section 111 to side section 112 and are suitably spaced from the outer edges of intermediate sections 113. Fixed to shafts 224 and 226 are crank arms 232 and 233 (Fig. 4) which are in the train for oscillating the tuyère members 133.

Referring to Figs. 3, 4 and 5, a second reduced speed shaft 213 of speed reducer 47 passes through jacket 64 and is journalled in bracket 237 fixed to top member 238 of fuel hopper 60. Suitable packing means may be used to insure a gastight joint where shaft 213 passes through jacket 64. As shown more particularly in Fig. 5, shaft 213 drives a bevel pinion 240 which meshes with pinion 241 fixed to the drive shaft 242 of a conveyor screw or screws 243. Conveyor shaft 242 also carries spur gear 244 which meshes with idler gear 245 that in turn meshes with spur gear 247. Spur gear 247 is fixed to shaft 265 which carries sprocket 264 that is in driving relation to a sprocket chain 267 that carries a plurality of scrapers 131 depending therefrom.

As is well known to those skilled in the art to which this invention pertains, stokers of this type are controlled by an electric switch in turn controlled by any convenient means such as a thermostat located in the building being heated. Assuming that the temperature in the region of the thermostat has fallen sufficiently to close the electric switch and admit electricity to motor 33, the latter will rotate blower 36 and supply air to duct 38 at a pressure above atmospheric pressure. Pipes 81, 96, 97 and 98 will conduct air under pressure to pressure responsive devices 82, 99 and 100, compacting the bellows and moving plungers 85 and 102 outward. Outward movement of plunger 85 will rotate rocker 87 about pivot 88 and rotate lever 89 and move link 95 downward rotating damper 92 to the dotted position shown in Fig. 1 obstructing the flow of gases through vent pipe 66. Vent pipe 66 carries away from jacket 64 all gases, smoke, fumes, etc., which may escape from stoker 25 only while the latter is idle. Simultaneously pressure responsive devices 99 and 100 will rotate dampers 106, to the dotted positions shown in Fig. 4 to admit air to assist combustion in the stoker. As soon as the temperature in the region of the thermostat has risen sufficiently to cause the thermostat to open the electric circuit motor 33 will cease driving blower 36 and the pressure in pressure responsive devices 82, 99 and 100 will drop. The resilient walls of the bellows members will expand them to their normal positions rotating damper 92 to its open position and rotating dampers 106 to their relatively closed positions. Free flow of gases will now take place through vent 66, and air will be admitted through openings 109 only as required to support combustion. This novel method of handling the air for combustion and the escaping fumes of a stoker accomplishes the very desirable result of preventing the escape of noxious fumes in the boiler room (which is always objectionable and, in the case of residences, is prohibitive), and, at the same time, automatically provides air for combustion when the stoker is in operation and reduces combustion to a minimum when the stoker is idle.

Assuming that the above described embodiment of the present invention is set up as above described, to place it in operation lids 70 of jacket 64 (Fig. 5) are opened and pieces of ignited material (paper, excelsior, wood shavings, etc.) are dropped into combustion chambers 68 followed by wood kindling, after which coal (or other solid fuel) is supplied with a shovel until chambers 68 have been filled up to the level of the lower edges of scrapers 131. Lids 70 are then closed and secured by turning handles 72 to rotate latches 75 into engagement with members 80. Electric motor 33 is then started putting blower 36 into operation and closing damper 92 in vent pipe 66 and opening dampers 106 in the lower sides of jacket 64. The air supplied through air duct 38 from blower 36 to ejector 40 produces an induced draft or suction in smoke-hood 31, in boiler 26 and in stoker 25 causing air to be drawn in through damper openings 109, through tuyères 133 through the burning fuel in chambers 68, and causing the hot gases of combustion to be drawn through tuyères 120 and 126, through cylindrical member 129 and through outlet member 29 into boiler 26 as indicated by arrows in Figs. 4, 5 and 6. This vigorous indraft of air through the stoker causes the fuel in combustion chambers 68 to ignite rapidly until combustion is taking place throughout combustion chambers 68 up to the zones indicated by dotted lines 270 (Fig. 4). As there are no inlet and outlet tuyères above the zones indicated by lines 270 the fuel in this space receives insufficient air to support combustion. Particles of dust, or "fly-ash," that may be held in suspension in the hot gaseous products of combustion are thrown out of the gaseous stream in turning the reverse curve in outlet member 29 at high velocity by the action of centrifugal force and are caught by the outwardly protruding edges of cross members 186 and 187 and deflected through the passages between these cross members into the passages 188 and 189. The reduced pressure in dust chamber 191 causes the particles thus trapped to be drawn or sucked through passages 190 and 193 into dust chamber 191. At the same time that electric motor 33 starts blower 36 it drives pulley 45 of speed reducer 47 through belt 44 driven by pulley 43 secured to motor shaft 37. Reduced speed shaft 203 (Fig. 3) is rotated, rotating cam 214 and imparting rectilinear reciprocating movement to rod 216 which in turn oscillates crank 220 and, through rod 221, likewise oscillates crank 223. Oscillation of cranks 220 and 223 rocks shafts 224 and 226 oscillating cranks 232 and 233.

Thereby the tuyères 133 are oscillated from cranks 232 and 233 as more particularly explained in my application Serial No. 298,661. Reciprocation of tuyères 133 produces many desirable results heretofore not obtained. It agitates the fuel in combustion chambers 68 breaking up arching, prevents formation of holes in the fuel bed due to "burning through" and works the fuel downward in combustion chambers 68. Reciprocation of tuyères 133 also produces a better distribution of air entering the fuel bed by constantly moving the tuyère openings to different positions relative to the fuel. As the fuel is worked downward in chambers 68 and combustion proceeds the fuel is reduced to ashes and its volume is reduced.

Because stoker sections 113 are V-shaped in cross section the incoming air in passing through tuyères 133 which are likewise V-shaped in cross section is allowed to spread laterally before it reaches the fuel in combustion chambers 68. The V-shaped cross section of center stoker sections 114 allows the gaseous products of combustion to converge after passing through the fuel in combustion chambers 68 before entering chamber 116. Air is therefore conducted to every portion of the burning fuel in chambers 68 preventing the formation of pockets of unburnt fuel and increasing the efficiency of the stoker.

Reciprocating movement of rod 216 imparts oscillating movement to crank arm 228 and through it reciprocates rod 229 and oscillates lever 211 causing the latter to slowly rotate ratchet wheel 210 rotating conveyor screw 195 to discharge fly-ash from chamber 191 into ash discharge 200. Automatic disposal of dust and fly-ash is therefore provided.

Speed reducer 47 also drives reduced-speed shaft 213 to rotate bevel pinions 240 and 241 whereby fuel is elevated from the scraper 60 by means of the conveyor screw or screws 243 and discharged into the chamber or space 180 at the top of the stoker. Here the fuel is distributed by the scrapers 181 with substantial uniformity around the space 180, surplus fuel not required to fill said space to the predetermined level being carried around by the scrapers and discharged into any suitable receptacle.

When the stoker of the present invention remains idle for long periods of time the fuel in space 180, above the dotted line 270 (Fig. 4), serves as a reserve to replenish the fuel consumed by the slow combustion in combustion chamber 68 resulting from the natural draft, and as this reserve is slowly consumed the fuel level in space 180 drops down toward dotted line 270. When demand for heat is resumed and the stoker is again put into operation fuel is supplied to the space 180 more rapidly than it can be consumed, so that said space is quickly refilled and the fuel level brought back up to that determined by the scrapers 181, after which surplus fuel is again discharged as before described.

Some fuels having very high volatile constituents require more or less air to be admitted to the hot products of combustion after they emerge from the combustion chambers. As seen in Fig. 6 a passage 330 is provided in the side of stoker section 112 and is closed by a sliding gate 331 operated by clip 332. Gate 331 fits tightly in its slots and is held by friction in any desired position. Passage 330 leads to a suitable opening 333 located at, or near, the center of the stoker. Gate 331 can be set to admit the proper amount of air for the needs of the particular fuel in use.

It will now be apparent that the present invention provides a novel cross draft type of stoker which is particularly suited for domestic installation; which is silent, efficient, compact, relatively inexpensive and flexible in installation; which can, after periods of idleness, promptly resume normal operation; in which combustion supporting gases reach every portion of the burning zone to reduce the formation of ashes and clinkering; in which positive means are provided to assist the gravity discharge of ash; and in which automatic means are provided for removing entrained particles in the gases of combustion. The present invention further provides a novel cross draft type of stoker in which a suitable amount of fire travel is provided to insure complete combustion of the gases of combustion; in which auxiliary means are operated in conjunction with the dampers of the stoker to remove fumes and gases when the stoker is idling; and in which novel means are provided for inducing the draft in the stoker.

To those skilled in the art changes in or modifications of the above described illustrative embodiment of the present invention will now be suggested without departing from the inventive concept of the invention. To determine the scope of the present invention reference should be had to the appended claims.

This application is a division of my application Serial No. 298,661, filed October 9, 1939, issued January 13, 1942, as U. S. patent No. 2,269,812, for Automatic stokers. The provisions herein disclosed for feeding fuel to the stoker are not claimed herein, but claimed in another division of my aforesaid application.

What is claimed is:

1. In combination in a cross draft stoker including a combustion chamber for solid fuel and means for conveying gaseous products of combustion to heat utilizing means, means for admitting air into said chamber to support combustion, means separate from said conveying means for conducting fumes from said chamber, means for forcing air through said chamber, means in said fume conducting means for closing the same, and means automatically operated by said air forcing means on starting for closing said means in said fume conducting means.

2. In combination in a cross draft stoker including a combustion chamber for solid fuel and means for conveying gaseous products of combustion to heat utilizing means, means providing a port for admitting air to said chamber to support combustion therein, means providing a second port for the escape of fumes from said chamber, means for supplying said chamber with a forced draft, said chamber having means of communication with said conveying means through which the draft is maintained when said last named means is in operation, and automatic means for closing said escape port and opening said air admitting port operable by said means for supplying a forced draft when said last named means starts operation.

3. In a cross draft stoker including a combustion chamber for solid fuel and means for conveying gaseous products of combustion to heat utilizing means, said chamber having outlet tuyères for the escape of the products of combustion from said chamber, inlet tuyères for the admission of air to support combustion in said chamber, motor driven means for producing a draft through said chamber, separate means for the escape of fumes emanating from said chamber during periods when said motor driven means is at rest, and means for closing said last named means operable by the starting of said motor driven means.

4. In combination in a cross draft stoker including a combustion chamber for solid fuel and means for conveying gaseous products of combustion to heat utilizing means, a housing enclosing said chamber, said housing having an opening for admitting air to support combustion in said chamber, motor driven means for producing a draft through said chamber, said chamber having means of communication with said conveying means through which the draft is maintained when said last named means is in operation, said housing having an opening for the escape of fumes emanating from said chamber when said motor driven means is at rest, and automatic means for closing said escape opening and opening said admission opening operable by said motor driven means on starting.

5. In a cross draft stoker including spaced end members, spaced side members and interior members spaced from said side members and defining a central combustion chamber and a casing enclosing the chamber and having an air admission opening, a damper in said opening, a vent pipe opening into said chamber, a damper in said vent pipe, motor driven means for producing a draft through said chamber, an outlet from said chamber for products of combustion through which the draft is maintained when said motor driven means are in operation, and means for opening said damper in said casing inlet opening and closing said damper in said vent pipe operated by the air pressure induced by said motor driven means.

6. In a cross draft stoker including spaced end members, spaced side members and interior members spaced from said side members and defining a central chamber and a casing enclosing the chamber, said casing having an air inlet opening, a damper in said opening, a vent pipe opening into said casing, a damper in said vent pipe, means for inducing a draft through said chamber, an outlet from said chamber for products of combustion through which the draft is maintained when the draft inducing means is in operation, and separate pressure responsive means operated by the air pressure induced by said last named means for respectively opening said damper in said inlet opening and closing said damper in said vent pipe when said draft inducing means is in operation.

7. In combination in a cross draft stoker including a combustion chamber for solid fuel, means for inducing a draft through the fuel in said chamber including an electrically operated blower, an air inlet to said chamber, an outlet from said chamber for products of combustion when said blower is in operation, means in communication with said chamber for the escape of fumes emanating from the fuel when said blower is at rest, means for closing said last named means, and pressure operated means operated by the air pressure induced by said blower for closing said means for escape of fumes when said blower is brought into operation.

8. In combination in a cross draft stoker including a combustion chamber for solid fuel, a housing for said stoker provided with an opening for the admission of air to support combustion in said chamber, a damper for controlling said opening, means for inducing a draft through the fuel in said chamber including an electrically operated blower, an outlet from said chamber for products of combustion when said blower is in operation, means in communication with said chamber for the escape of fumes emanating from the fuel when said blower is at rest, pressure operated means operated by the air pressure induced by said blower for closing said last named means when said blower is brought into operation, and separate pressure operated means operated by the air pressure induced by said blower for opening said damper when said blower is brought into operation.

9. In combination in a cross draft stoker including a combustion chamber for solid fuel, a housing for said stoker having an opening for admitting air to said chamber to support combustion in said chamber, damper means controlling said opening, pressure operated means operatively connected to said damper means, a blower for inducing a flow of air through the fuel in said chamber, separate outlets from said chamber for products of combustion when said blower is in and out of operation, control means for one of said outlets, and means for applying the air pressure induced by said blower to said pressure operated means to effect the automatic opening and closing of said damper means and the automatic closing and opening of said control means from said blower when said blower is respectively brought into and out of operation.

10. In combination in a cross draft stoker including a combustion chamber for solid fuel, a housing for said stoker having an opening for admitting air to said chamber to support combustion in said chamber, damper means controlling said opening, pressure operated means operatively connected to said damper means, a blower for inducing a flow of air through the fuel in said chamber, an outlet from said chamber for products of combustion when said blower is in operation, means for applying the air pressure induced by said blower to said pressure operated means to effect the automatic opening and closing of said damper means from said blower when said blower is respectively brought into and out of operation, a vent pipe in communication with said chamber for the escape of fumes when the blower is not in operation, and pressure operated means operated by the air pressure induced by said blower for respectively closing and opening said vent pipe when said blower is brought into and out of operation.

11. In combination in a cross draft stoker including a combustion chamber for solid fuel, a housing for said stoker having an opening for admitting air to support combustion in the chamber, said chamber communicating with a passage through which the products of combustion may flow, means for inducing flow through said passage including a blower for delivering air under pressure to said passage, means in communication with said chamber for leading fumes therefrom when said stoker is not in operation, a damper associated with said last named means, and pressure responsive means operatively connected to said damper and responsive to the pressure developed by said means for inducing air flow for closing said damper.

12. In combination in a cross draft stoker including a combustion chamber for solid fuel, a housing for said stoker having an opening for admitting air to said chamber to support combustion in the stoker, a damper associated with said opening, said chamber communicating with a passage through which the products of combustion may flow, means for inducing flow through said passage including a blower for delivering air under pressure to said passage, means communicating with said chamber for permitting the escape of fumes when said stoker is not in operation, a damper associated with said last named means, and separate pressure responsive means each operatively connected to a damper and operable by air under pressure induced by said blower for opening said first named damper and closing said last named damper only when a predetermined pressure of air has been built up by said blower.

WESTON M. FULTON.